United States Patent Office 2,728,734
Patented Dec. 27, 1955

2,728,734

EXPANSION JOINT SEALING COMPOSITION

Richard H. Cubberley, Morris Township, and John J. Drukker, Wyckoff, N. J., assignors to The Patent and Licensing Corporation, New York, N. Y., a corporation of Massachusetts No Drawing. Application November 30, 1951, Serial No. 259,314

9 Claims. (Cl. 260—28.5)

This invention relates to an expansion joint sealing composition, and is more particularly concerned with an improved expansion joint sealing composition of the hot-poured type.

In the construction of concrete pavements, such as the concrete runways of airports and concrete highways, the joints between the sections of concrete are provided with filler strips serving as expansion and contraction joints and a sealing compound is then applied over the filler strips in order to seal the joint against infiltration of moisture. To be effective for this purpose, it is necessary that the joint sealing compound be resilient and at the same time have high adhesivity with respect to the concrete so that there will be no failure of the bond between the sealing compound and the concrete during repeated cycles of expansion and contraction under the atmospheric conditions to which the pavement is subjected in service. Further, the sealing composition must maintain a high degree of adhesivity and plasticity at temperatures of 0° F. or lower, and it must not flow out of the joints or be susceptible to being picked up by vehicle tires at summer temperatures. The performance requirements of this type of composition are set forth, for example in Federal Specification SS–F–336A (May 19, 1947). Various bituminous and rubberized bituminous compositions have been proposed as hot-poured expansion joint sealers but they have been found to suffer from one or more disadvantages from the standpoint of performance. Some of these compositions have exhibited undesirable flow characteristics. In order to inhibit undue cold flow, others have been proposed containing numerous materials such as relatively expensive resins, and the like which increase the cost of the material, and fillers which tend to affect adversely the homogeneity and adhesivity of the composition.

It is the object of this invention to provide an improved expansion joint sealing composition of the hot-poured type which has desirable flow and adhesion characteristics, is economical to manufacture and does not require the use of resins and the like.

Other objects and advantages of the invention will be apparent from the detailed description hereinbelow.

According to the invention, an improved joint sealing composition may be produced by combining asphalt, a scrap rubbery material, such as butadiene-styrene copolymer or mixtures thereof with natural rubber, and a cyclic hydrocarbon material obtained by treatment of heavy petroleum oil fractions, such as lubricating oil fractions, with an organic solvent and predominantly composed of aromatic and naphthenic hydrocarbons. The composition of the invention is a homogeneous blend of asphalt and rubbery material, the cyclic hydrocarbon oil extract functioning, at least in part, to promote the homogeneous blending of the asphalt and rubber, whereby there is obtained a joint sealing composition having high adhesivity for concrete, excellent resistance to cold flow and having other characteristics and properties desirable in joint sealing compositions of the character indicated. While we do not wish to be bound by any particular theory, we believe that the desirable cohesive and adhesive properties of our composition may be accounted for by the highly aromatic and naphthenic character of the hydrocarbon extract which we employ in effecting the homogeneous blending of asphalt and rubbery material, the aromatic portion of the extract apparently having an affinity for the rubber and the naphthenic portion of the extract having an affinity for the asphalt. The cyclic hydrocarbon material induces a gel-like structure in the composition which is responsible for the desirable physical properties of the composition.

The cyclic hydrocarbon material employed in the composition of the invention is the portion of petroleum oil fractions of the lubricating oil range which is separated from such fractions by so-called selective solvent extraction processes, using organic solvents which preferentially dissolve the aromatic and naphthenic constituents of such heavy petroleum oil fractions. Such solvent extraction is normally carried out in the refining of petroleum oils, particularly the heavier fractions, in order to provide lubricating oils of desirable characteristics. The organic solvents which are usually employed for this purpose are oxygen-containing compounds, such as phenol, cresol, dichloroethylether, furfural, nitrobenzene, and the like. The solvent and the contained cyclic hydrocarbon components are separated from the thus treated lubricating oil and the solvent is distilled off from the extracted portion to leave the cyclic hydrocarbon extract as a residual product.

While the viscosity and the other physical properties of these cyclic hydrocarbon extracts vary somewhat, depending upon the particular petroleum oil fraction or fractions from which the extract is derived, they are generally characterized by a relatively low volatility. Two typical cyclic hydrocarbon extracts have the following characteristics:

| | A | B |
|---|---|---|
| Specific gravity | 0.9958 | 1.021 |
| Flash point, ° F | 450 | 520 |
| Pour point, ° F | 35 | 75 |
| Saybolt viscosity, seconds, at: | | |
| 210° F | 110 | 720 |
| 110° F | 1,350 | 35,000 |
| Iodine number | 10 | 13 |
| Distillation, 1 mm. absolute, ° F.: | | |
| 1% | 393 | 463 |
| 10% | 417 | 520 |
| 30% | 442 | 559 |
| Volatility (Evap. loss, mg./10 g.—1 hr., oven 100° C.) | 5 | 2 |

The scrap rubbery component of our joint sealing composition is butadiene-styrene copolymer, commercial forms of which are known as GR–S (generally approximately 23.5% by weight of the hydrocarbon present is derived from styrene), or mixtures of butadiene-styrene copolymer with natural rubber wherein the natural rubber comprises not more than about 55% of the mixture or conversely the copolymer comprises at least 50% of the scrap. The scrap rubbery component is in the form of scrap vulcanized rubber. The rubbery component is desirably employed in moderately finely divided form, preferably, passing a 20 mesh screen.

The asphalt component of our composition preferably has a softening point (ring and ball) of about 155° F., and a penetration (77° F., 100 grams, 5 seconds) of about 75. The asphalt may, however, vary considerably from these values, depending upon the softening point and penetration values desired in the final product. We have found it convenient to use two types of asphalt, one of relatively low penetration and high melting point, and one of somewhat higher penetration and lower melting point, and to combine these with the rubber component in the manner hereafter set forth.

In carrying out the present invention, the rubbery component, the cyclic hydrocarbon extract and a portion of the asphalt are preferably first compounded in a suitable mixing unit, such as a Werner-Pfleiderer mixer, whereby solvation of the rubbery component in the presence of the asphalt is effected, and the remainder of the asphalt is then gradually incorporated in the blend. The proportion of cyclic hydrocarbon extract which is employed will vary, depending upon the nature of the rubbery material. Generally speaking, increased amounts of cyclic hydrocarbon extract are required per part of rubbery component as the percentage of butadiene-styrene copolymer in the rubbery component increases. For example, in preparing a composition in which the rubbery component is substantially 100% butadiene-styrene copolymer, 1 part of extract per part of rubbery component may be suitably used; whereas, when the rubbery component comprises about 60% butadiene-styrene copolymer and 40% natural rubber, about 0.6 part of extract per part or rubbery component may be employed. In general, the proportion of cyclic hydrocarbon extract will vary from about ½ parts to about 1½ parts per part of butadiene-styrene copolymer in the rubbery component. The proportion of asphalt to rubbery material will likewise vary, depending upon the nature of the rubbery component and the characteristics of the asphalt, but generally speaking, the composition of the invention contains from about 1½ to about 3 parts of asphalt, preferably about two parts, per part of the rubbery component and the asphalt content preferably should not be below about 50% of the total composition.

The rubbery component, preferably in ground form passing 20 mesh, the cyclic hydrocarbon extract and a portion, say about ⅓, of the asphalt, are mixed in a mixer maintained at a temperature of about 315° to 335° F., until the rubber has been well solvated. The remainder of the asphalt is then gradually added and the mixing continued until the desired degree of blending has been effected. The composition is then discharged from the mixer into suitable containers and allowed to cool and harden. We have found that the addition of only a portion of the asphalt in the initial mixing operation permits a more rapid and efficient blending of the asphalt with the rubbery material, especially in the presence of the cyclic hydrocarbon extract. When employing a relatively hard asphalt (e. g. 10 penetration) and a relatively soft asphalt (e. g. 110 penetration), a portion of the softer asphalt is used in the initial mixture. After solvation of the rubber has been effected, the harder asphalt is added followed by the remainder of the softer asphalt. In some cases, all of the softer asphalt may be added in the initial charge.

When it is desired to use our joint sealing composition in the construction of concrete pavements to seal the joints thereof, the composition is liquefied by heating it to a temperature of about 410° F., at which temperature it is in fluid condition and may be poured into the joints. Care must be taken in liquefying the composition in order not to heat it to temperatures above about 450° F. because of the likelihood of thereby adversely affecting its flow characteristics.

The following specific examples are given for a more complete understanding of the invention, but they are intended as exemplifications of the invention and not as limitations upon the scope thereof.

In the following examples, the tests on the finished composition were carried out in accordance with the procedures prescribed in Federal Specification SS–F–336A (May 19, 1947). Compositions which meet the requirements of this specification have a cone penetration (77° F., 150 grams, 5 seconds) not exceeding 0.90 centimeter; a flow at 140° F., measured according to a specified procedure, not exceeding 0.5 centimeter; and must not crack, separate or otherwise fail when subjected to 5 cycles in a specified "bond test" at 0° F.

*Example I*

In a Werner-Pfleiderer mixer, a batch consising of 600 parts by weight of GR–S peels (scrap), ground to 20 mesh, 600 parts by weight of cyclic hydrocarbon extract, and 515 parts by weight of an asphalt having a softening point (ring and ball) of about 110 and a penetration (77° F., 100 grams, 5 seconds) of about 110, was mixed until thorough solvation of the rubber was effected, which required about 6½ hours. During the mixing operation, the temperature of the mixture was about 320° F. To the thus solvated rubber was then added 710 parts by weight of an asphalt having a softening point of about 230° F., and a penetration of 10 and an additional 575 parts by weight of the 110° softening point and 110 penetration asphalt previously identified. After all the components had been added, the batch was further mixed until homogeneous, which required about an hour. The resulting product had the following composition:

| | Percent |
|---|---|
| Rubber | 20 |
| Asphalt 110 penetration | 36.3 |
| Asphalt 10 penetration | 23.7 |
| Cyclic hydrocarbon extract | 20 |

The composition, when tested according to the Federal Specification, exhibited the following properties:

| | |
|---|---|
| Cone penetration | 73. |
| Flow | 0.3 centimeter. |
| Bond | Passed 5 cycles. |

*Example II*

Following the procedure of Example I, a mixture was prepared containing 1180 parts by weight of GR–S ground peels, 940 parts by weight of cyclic hydrocarbon extract and 1880 parts by weight of asphalt of 110° F. softening point and 110 penetration. After mixing and solvating the rubber for four hours at a temperature of about 320° F., there were added 1345 parts by weight of asphalt having a softening point of 230° F. and penetration of 10. Mixing was continued for about an hour at a temperature of about 320° F.

The composition of the resulting product was as follows:

| | Percent |
|---|---|
| Synthetic rubber | 22.1 |
| Asphalt 110 penetration | 35.2 |
| Asphalt 10 penetration | 25.1 |
| Cyclic hydrocarbon extract | 17.6 |

The following test results were obtained on this composition:

| | |
|---|---|
| Cone penetration | 72. |
| Flow | 0.1 centimeter. |
| Bond | Passed 5 cycles. |

*Example III*

In this example, the initial batch contained 835 parts by weight of natural rubber ground peels, 1255 parts by weight of GR–S ground peels, 1120 parts by weight of cyclic hydrocarbon extract and 1190 parts by weight of 110 penetration asphalt. These were mixed for a period of about 4 hours at a temperature of about 320° F. In the second step of the procedure, there were added 1590 parts by weight of 10 penetration asphalt and an additional 1470 parts by weight of 110 penetration asphalt. Mixing was continued for about one hour at a temperature of 320° F. The proportions of the various components in the composition were:

| | Percent |
|---|---|
| Natural rubber | 11.2 |
| Synthetic rubber | 16.8 |
| Asphalt 110 penetration | 35.6 |
| Asphalt 10 penetration | 21.4 |
| Cyclic hydrocarbon extract | 15 |

Tested according to the Federal Specification, this composition showed the following characteristics:

Cone penetration _____ 86.
Flow _____ 0.2 centimeter.
Bond _____ Passed 5 cycles.

Example IV

Again following the procedure used in the previous examples, 785 parts by weight of rubbery material containing approximately 50% by weight of natural rubber and 50% by weight of GR–S, in the form of ground peels passing 20 mesh, 420 parts by weight of cyclic hydrocarbon extract and 450 parts by weight of 110 penetration asphalt were mixed and the rubber solvated for approximately 3 hours at a temperature of between 315° F. and 335° F. To this mixture was then added 595 parts by weight of 10 penetration asphalt followed by an additional 550 parts by weight of 110 penetration asphalt, and the mixing continued for approximately one hour. The components of the resulting composition were present in the following proportions:

|  | Percent |
|---|---|
| Rubber | 28 |
| Asphalt 110 penetration | 36 |
| Asphalt 10 penetration | 21 |
| Cyclic hydrocarbon extract | 15 |

Tested according to the Federal Specification, the following results were obtained:

Cone penetration _____ 70.
Flow _____ 0.2 centimeter.
Bond _____ Passed 5 cycles.

In accordance with the invention, as hereinabove described and exemplified by specific illustrations, highly effective expansion joint sealing compositions may be prepared which have unusual adhesivity for concrete, are resistant to cold flow and effectively insure against the infiltration of moisture into expansion joints during repeated cycles of expansion and contraction under conditions encountered in service. They have high resiliency and excellent wearing properties and are capable of withstanding heavy traffic without injury.

It will be understood that "peels" as used in all of the examples refers to scrap rubber such as that used in automobile tires and tubes. This material is capable of being ground to 20 mesh as indicated above, and may be mixed directly in a mixer as shown in the examples without the use of a rubber mill. This vulcanized scrap rubber is to be distinguished from reclaim rubber or natural or synthetic rubber in its original form. With natural rubber, for example, a two step process involving the use of a rubber mill is necessary. The final product will pass the flow test and there is sufficient gel structure to give the desired product.

This application is a continuation in part of our co-pending application, Serial No. 21,765, filed April 17, 1948, now abandoned.

It will be obvious that various changes and modifications may be made without departing from the spirit or scope of the invention as defined in the appended claims, and it is, therefore, intended that the foregoing shall be interpreted in an illustrative and not in a limiting sense.

We claim:

1. An expansion joint sealing composition of the hot poured type comprising ground vulcanized scrap rubber, asphalt, and a cyclic hydrocarbon extract obtained from lubricating oil by selective solvent extraction with an organic solvent, said scrap containing not less than 45% by weight of a rubbery copolymer of butadiene-styrene and from 0% to 55% by weight natural rubber, and wherein said cyclic hydrocarbon is present in the proportion of one-half to one and one-half parts by weight per part of butadiene-styrene and wherein the asphalt is present in the proportion of one and one-half to three parts by weight per part of rubber.

2. An expansion joint sealing composition of the hot poured type consisting of ground vulcanized scrap rubber, asphalt, and a cyclic hydrocarbon extract obtained from lubricating oil by selective solvent extraction with an organic solvent, said scrap containing not less than 45% by weight of a rubbery copolymer of butadiene-styrene and from 0% to 55% by weight natural rubber and wherein said cyclic hydrocarbon is present in the proportion of one-half to one and one-half parts by weight per part of butadiene-styrene and wherein the asphalt is present in the proportion of one and one-half to three parts by weight per part of rubber.

3. An expansion joint sealing composition of the hot poured type comprising ground vulcanized scrap rubber, asphalt, and a cyclic hydrocarbon extract obtained from lubricating oil by selective solvent extraction with an organic solvent, said scrap containing not less than 45% by weight of a rubbery copolymer of butadiene-styrene and from 0% to 55% by weight natural rubber, wherein the cyclic hydrocarbon is present in an amount about equal by weight to the amount of butadiene-styrene and wherein the asphalt is present in the proportion of one and one-half to three parts by weight per part of rubber.

4. An expansion joint sealing composition of the hot poured type comprising ground vulcanized scrap rubber, asphalt, and a cyclic hydrocarbon extract obtained from lubricating oil by selective solvent extraction with an organic solvent, said scrap containing not less than 45% by weight of a rubbery copolymer of butadiene-styrene and from 0% to 55% by weight natural rubber, in which the asphalt comprises at least 50% by weight of the total composition and wherein the cyclic hydrocarbon is present in the proportion of one-half to one and one-half parts by weight per part of butadiene-styrene.

5. An expansion joint sealing composition of the hot poured type comprising ground vulcanized scrap rubber, asphalt, and a cyclic hydrocarbon extract obtained from lubricating oil by selective solvent extraction with an organic solvent, said scrap containing not less than 45% by weight of a rubber copolymer of butadiene-styrene and from 0% to 55% by weight natural rubber, wherein the cyclic hydrocarbon has a flash point of about 450° F. and a Saybolt viscosity at 210° F. of about 110, and wherein said cyclic hydrocarbon is present in the proportion of one-half to one and one-half parts by weight per part of butadiene-styrene and wherein the asphalt is present in the proportion of one and one-half to three parts by weight per part of rubber.

6. An expansion joint sealing composition of the hot poured type comprising about 20% by weight of copolymerized butadiene-styrene ground vulcanized scrap rubber, about 60% by weight asphalt, and about 20% by weight of a cyclic hydrocarbon extract obtained from lubricating oil by selective solvent extraction with an organic solvent.

7. A process for preparing an expansion joint sealing composition of the hot poured type which consists of mixing together, at an elevated temperature, ground vulcanized scrap rubber containing at least 45% by weight copolymerized butadiene-styrene and from 0% to 55% by weight natural rubber, asphalt, and a cyclic hydrocarbon extract obtained from lubricating oils by solvent extraction by an organic solvent, and wherein said cyclic hydrocarbon is present in the proportion of one-half to one and one-half parts by weight per part of butadiene-styrene and wherein the asphalt is present in the proportion of one and one-half to three parts by weight per part of rubber.

8. A process for preparing an expansion joint sealing composition of the hot poured type which consists of mixing together at an elevated temperature, finely ground vulvanized scrap rubber containing at least 45% by weight copolymerized butadiene-styrene and from 0% to 55% by weight natural rubber, a small portion of the total asphalt, and a cyclic hydrocarbon obtained from lubricating oil by extraction with an organic solvent and subsequently mixing in the rest of the asphalt, and wherein said cyclic hydrocarbon is present in the proportion of one-half to one and one-half parts by weight per part of butadiene-styrene and wherein the asphalt is present in the proportion of one and one-half to three parts by weight per part of rubber.

9. A process for preparing an expansion joint sealing composition of the hot poured type which consists of mixing together at an elevated temperature ground vulcanized scrap rubber containing at least 45% by weight copolymerized butadiene-styrene and from 0% to 55% by weight natural rubber, a low melting high penetration asphalt and a cyclic hydrocarbon obtained from lubricating oil by extraction with organic solvent, and subsequently adding to the mixture a lower penetration high melting asphalt wherein said cyclic hydrocarbon is present in the proportion of one-half to one and one-half parts by weight per part of butadiene-styrene, and wherein the asphalt is present in the proportion of one and one-half to three parts by weight per part of rubber.

References Cited in the file of this patent

UNITED STATES PATENTS

| | | |
|---|---|---|
| 2,431,386 | Fischer | Nov. 25, 1947 |
| 2,470,141 | Caves | May 17, 1949 |
| 2,546,659 | Sussenbach | Mar. 27, 1951 |